(12) United States Patent
Minkkinen

(10) Patent No.: US 7,871,458 B2
(45) Date of Patent: Jan. 18, 2011

(54) APPARATUS AND METHOD FOR ENERGY RECOVERY

(75) Inventor: Ari Antero Minkkinen, Bruinisse (NL)

(73) Assignee: Xsorb Eco Technology B.V., Bruinisse (NL)

( * ) Notice: Subject to any disclaimer, the term of this patent is extended or adjusted under 35 U.S.C. 154(b) by 0 days.

(21) Appl. No.: 12/520,543

(22) PCT Filed: Dec. 19, 2007

(86) PCT No.: PCT/EP2007/064246

§ 371 (c)(1),
(2), (4) Date: Oct. 7, 2009

(87) PCT Pub. No.: WO2008/074841

PCT Pub. Date: Jun. 26, 2008

(65) Prior Publication Data

US 2010/0031820 A1    Feb. 11, 2010

(30) Foreign Application Priority Data

Dec. 20, 2006  (GB) ................................ 0625377.7

(51) Int. Cl.
*B01D 53/02* (2006.01)

(52) U.S. Cl. ............................ 95/121; 95/126; 95/148; 62/94

(58) Field of Classification Search .................... 95/113, 95/117, 121–123, 126, 148; 96/125; 62/94, 62/271; 236/44 R, 44 A; 165/7, 8
See application file for complete search history.

(56) References Cited

U.S. PATENT DOCUMENTS

| | | | | |
|---|---|---|---|---|
| 4,290,789 A | * | 9/1981 | Newton | 96/126 |
| 4,380,458 A | * | 4/1983 | Callihan | 95/126 |
| 4,474,021 A | | 10/1984 | Harband | |
| 4,484,617 A | * | 11/1984 | Sizmann | 165/104.12 |
| 4,909,307 A | | 3/1990 | Besik | |
| 5,131,238 A | * | 7/1992 | Meckler | 62/271 |
| 5,228,303 A | * | 7/1993 | Assaf | 62/94 |
| 5,542,968 A | * | 8/1996 | Belding et al. | 96/125 |
| 5,732,562 A | | 3/1998 | Moratalla | |

(Continued)

FOREIGN PATENT DOCUMENTS

DE         2416294 A1    10/1975

(Continued)

*Primary Examiner*—Frank M Lawrence
(74) *Attorney, Agent, or Firm*—Coraline J. Haitjema; David P. Owen; Howrey LLP

(57) ABSTRACT

There is provided a heating system for a building comprising; i) a heater; ii) a media flow passage through which a medium heated by the heater passes in order to distribute heat through the building; and iii) a heat recovery apparatus for recovering latent heat of adsorption from a humid gas. The heat recovery apparatus comprises a) a gas flow passage connected at one end to a source of humid gas; b) a desiccant material provided within the gas flow passage such that the humid gas contacts the desiccant material and water vapor is adsorbed releasing latent heat of adsorption; wherein the media flow passage and gas flow passage are in heat exchanging relationship, such that when the desiccant material adsorbs water vapor from the exhaust gas the latent of the adsorption is at least partially transmitted to the medium.

26 Claims, 5 Drawing Sheets

U.S. PATENT DOCUMENTS 6,406,522 B1 * 6/2002 McFadden et al. ............ 95/113

FOREIGN PATENT DOCUMENTS

| | | | |
|---|---|---|---|
| DE | 3041265 | A1 | 9/1982 |
| EP | 0097216 | A | 1/1984 |
| JP | 57202414 | A | 12/1982 |
| NL | 8105803 | A | 7/1983 |

* cited by examiner

View Section A A

APPARATUS AND METHOD FOR ENERGY RECOVERY

FIELD OF THE INVENTION

The present invention relates to a building comprising an apparatus for recovering latent heat of adsorption from a humid gas source associated with the building, in particular a residential or commercial dwelling. The invention furthermore relates to a method of recovering latent heat of adsorption from a humid gas, in particular an exhaust gas associated with a residential or commercial dwelling.

BACKGROUND

Internal heating for comfort of residential and commercial dwellings is very often practised by heating and circulating water in carbonaceous-fuel-fired or electric heaters and passing the hot water through convection heat exchangers (often called radiators) to heat the inside surrounding air while cooling the water. The cooled water is then returned to the fired heater to be reheated. Usually the water is heated to as high as 80° C. and the return water is cooled to near ambient room temperature as low as 20° C. so as much as 60 kcal/kg of sensible heat is taken from and needs to be re-supplied to the water by the combustion of a carbonaceous fuel such as natural gas or by the consumption of electric power.

In the combustion of, for example natural gas, carbon dioxide ($CO_2$) and water vapour are formed into the flue gas while roughly 10,000 kcal/kg of combustion heat energy is released to heat water. In efficient modern heating systems, the exiting flue gas is partially cooled by heat exchange with the inlet cool water to within about a 20° C. approach to the inlet temperature giving a rather high thermal efficiency; sometimes with partial combustion water condensation. The flue gas is then admitted to a stack in a chimney at around 50° C. and very often saturated with water vapour. Emission of this humid flue gas heat to the atmosphere afflicts an appreciable loss of a potential humid heat energy which could be recovered. Today the improvement of the energy efficiency, especially, for carbonaceous-fuel-fired systems is a very important concern for the residential or commercial dwelling owner not only to reduce the expense of fuel energy consumption but also to reduce the emission of the greenhouse gas $CO_2$ known to impact on global warming.

When the latent heat of water condensation, roughly 550 kcal/kg of water, can be beneficially captured to useful heating from combustion of methane, for example, there would immediately be an increase in thermal efficiency resulting in more than 10% savings in the fuel required since one kg of methane combusted yields slightly more than two kg of water.

Many improvements have been made today to the conventional carbonaceous fuel fired heating system. Some incorporate heat exchange equipment to condense combustion water. However, low temperatures and high flow rates of cold fluids are needed to condense an appreciable amount of water from flue gases. Lest it be for preheating an enormous flow rate of cold air, these low heat exchange temperatures are generally not suitable for transfer of heat to a circulating water system used to warm a residential or commercial dwelling during the colder months of the year. Condensing beat exchange is not suitable for fuels heavier than LPG where more excess air is needed resulting in flue gas water dew point temperatures which are considerably lower. Moreover, water condensation heat exchange surface requires a resistance to carbonic acid corrosion which results from the presence of $CO_2$ in the flue gases. The resulting condensed sour water may not be simply passed to a closed drain for disposal and may require some treatment. If sulphur impurities would also be present in the carbonaceous fuels, water condensation should be completely avoided due to even more severe sulphurous acid type corrosion and condensed water pollution.

Inside the average residential dwelling there are many other sources of humid energy.

Some are generated simply by the breathing of human beings and animals living therein. Some are generated from activities related to drying laundry and cooking (here boiling water to cook potatoes is a good example). Most of the time these sources of humidity are ventilated to the outside to enhance the internal comfort level. Capture of this humid energy could be very beneficial if it can be achieved in a cost effective and useful manner. Dwellings heated with electricity where combustion water is not formed could also benefit from the collection of these other humid heat sources to save electric power consumption. Commercial dwellings also contain such sources of humid energy, for example the breathing of workers and the boiling of kettles.

SUMMARY OF INVENTION

In accordance with the present invention there is provided a heating system for a building comprising;
  i) a heater;
  ii) a media flow passage through which a medium heated by the heater passes in order to distribute heat through the building; and
  iii) a heat recovery apparatus for recovering latent heat of adsorption from a humid gas, comprising;
    a) a gas flow passage connected at one end to a source of humid gas;
    b) a desiccant material provided within the gas flow passage such that the humid gas contacts the desiccant material and water vapour is adsorbed releasing latent heat of adsorption; wherein
  the media flow passage and gas flow passage are in heat exchanging relationship, such that when the desiccant material adsorbs water vapour from the exhaust gas the latent of the adsorption is at least partially transmitted to the medium.

In accordance with an alternative aspect of the present invention there is provided a method of heating a building, comprising the steps of;
  i) heating a distribution-medium by means of a heater;
  ii) circulating the heated distribution-medium through the building to distribute the heat; and
  iii) recovering the latent heat of adsorption from a humid gas by;
    a) contacting the humid gas with a desiccant material such that water vapour is adsorbed by the desiccant and the latent heat of adsorption is released as sensible heat; and
    b) heat exchanging the desiccant material and/or the gas with the distribution-medium such that at least a portion of the released sensible heat is passed to the medium.

The invention preferably concerns the capture of the humid heat energy of the cold incoming ventilation air, the humidity generated within a residential or commercial dwelling and/or the humidity of the expelled combustion flue gas where the dwelling is heated by carbonaceous fuel combustion. Hence the source of the humid gas, from which the heat of adsorption is recovered, is preferably selected to be one or more of a humid gas drawn from a room of the building, the room having a source of humidity such as, for example, respiration of animals, transpiration of plants, evaporation of water from other sources; a flue gas of a carbonaceous-fuel burning heater; or humid air drawn from outside the building.

The captured heat is used to heat or preheat a circulating heat-distribution medium, for example water. The heater is preferably a carbonaceous-fuel burning heater or an electrically powered heater. Since the heat-distribution media is also heated by the recovered heat, the fuel or power consumption to heat the circulating medium is significantly reduced and less $CO_2$ is directly or indirectly emitted to the atmosphere.

The medium may be heated by the captured heat in series or parallel with the heater.

The medium which is heated may be, for example, a gas, such as air used in an air heating system particularly useful in large buildings such as shopping malls, passenger terminals, office buildings or warehouses; or a liquid, such as water or aqueous solutions as used in conventional domestic heating systems.

The capture of the water vapour from the humid air and/or flue gases is made possible by the physical mechanism of adsorption to a desiccant material, for example solid phase materials such as silica gels, activated alumina, activated bauxite and molecular sieves.

It is well known in the gas processing industry that these desiccants exhibit a high selective affinity to adsorb polar vapour molecules from gases, such as water and to a lesser extent $CO_2$. Moreover, it is known to those skilled in the art of gas dehydration that upon water adsorption to the pores on the surface and furthermore by a capillary penetration to the interior of the particles, the solid adsorbent temperature increases due to a heat of adsorption. This heat effect is always more than the latent heat of water condensation since it includes the thermodynamic heat of wetting (also known as the thermodynamic heat of adhesion). Using such desiccants it is possible to adsorb (condense) water vapour from air and other gases at temperatures well above the water dew point of the gas, meaning there is no need for a cold heat exchange surface. Moreover, it is possible to recover not only the heat of water condensation but also the heat of adhesion, which for some desiccants can be quite significant.

While it is not an essential attribute in this invention some desiccant materials (for example molecular sieves such as zeolites) are able to adsorb essentially all of the water vapour from a humid gas, the dryness of a gas exiting a bed of desiccant being as low as minus 100° C. dew point corresponding to approximately 1 ppm (part per million) of water in the gas.

The desiccant material is preferably provided in the form of a fixed bed of material having a large cross-sectional area and being relatively thin in the direction of flow of the humid gas. This advantageously reduces the pressure drop associated with passing a gas through a bed of desiccant material.

It is preferred that the step of contacting the humid gas with the desiccant material is carried out isothermally with the temperature of the desiccant material being maintained at a temperature in the range from 20 to 70° C., preferably 30 to 60° C., and most preferably 40 to 50° C.

The temperature of the desiccant material is preferably maintained by passing the heat generated through adsorption of the vapour to a cooling medium, that is the heat distribution-medium of the heating system, thereby removing the heat.

A further advantage of the invention is found in that aqueous carbonic or sulphurous acid corrosion problems associated with cold surface water condenser systems are avoided because free water is never present.

The adsorption of the water vapour can be made to take place isothermally at temperature levels around 50° C. to adequately serve as a heat source for preheating circulating water above ambient dwelling temperatures. Any $CO_2$ co-adsorbed also contributes to this heat recovery.

By way of example only the potential energy saving benefits can be calculated as follows. Consider an average residential dwelling having a seasonal heating requirement of 10 Gcal. If this amount of heat needs to be supplied by burning natural gas as fuel at a net heating value of 10 000 kcal/kg then 1 000 kg or 1 tonne of natural gas is consumed.

For simplicity, take the natural gas as pure methane with a molecular mass of 16 kg/kmol.

Thus, 1 000/16=62.5 kmols of methane would be combusted with preheated air according to the following molar stoichiometric combustion formula:

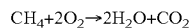

$$CH_4 + 2O_2 \rightarrow 2H_2O + CO_2$$

To combust 62.5 kmoles of methane requires 125 kmols of oxygen (nearly 600 kmols of air) and thus yields 125 kmols× 18 or 2 250 kg (2.25 tonnes) of water vapour having a molecular mass of 18 into the flue gas. For simplicity this doesn't include water vapour present in the combustion air nor any excess air over combustion requirement.

If the differential equilibrium capacity of the solid desiccant material is taken as 40 wt. % then 5625 kg of desiccant will be needed for the adsorption of humid energy in the desiccant bed (17) from the flue gas alone during this heating adsorption cycle.

At a bulk density of 800 kg/m³ roughly 7.0 m3 of desiccant volume will need to be made available only for the capture of the flue gas humidity.

To this volume of desiccant needs to be added the volume occupied by the cold water tubing coils. If the volume allocated for the heat transfer coils represents 25% of the total volume of the compartment (17) then its overall volume will be somewhat less than 10 m³. This could be configured as a rectangular shape volume having a height of 2 meters, a width of 1 meter and a length of 5 meters.

Adsorption of 2 250 kg of water vapour the with a typical heat of adsorption (550 kcal/kg heat of condensation+250 kcal/kg heat of wetting) of 800 kcal/kg the heat recovered for beneficial preheating of circulating water and therefore reduction in gas firing will be:

2 250 kg×800 kcal/kg=1 800 000 kcal or 1.8 Gcal equivalent to a savings of 180 kg of methane consumption.

This represents a reduction of 18% on the heating energy cost and a carbon dioxide emissions reduction of 500 kg for the residential dwelling only from the capture of humid energy from the flue gas into the desiccant bed.

Obviously, with the capture of additional humid heat produced within the dwelling from human activities further fuel energy savings can be realised. If for the sake of argument the additional generation of humidity is taken as equal to that of gas combustion over the heating adsorption cycle then the overall heating energy cost can be reduced by close to 40% and carbon dioxide by one tonne. Obviously, double the volume of desiccant would be required.

In a preferred embodiment the desiccant also adsorbs $CO_2$ thus releasing the heat of adsorption of $CO_2$ and reducing the $CO_2$ emission at least temporarily.

The water adsorption and $CO_2$ retention capacity of the desiccant material in the present invention is of course finite. The period of time for which a particular quantity of desiccant will be effective depends upon average adsorption temperature and desiccant activity. Commonly used desiccants such as silica gel, alumina, activated bauxite and molecular sieves have an equilibrium water retention capacity at ambient temperature in the range of 20 to 60 $kg_{water}/100\ kg_{desiccant}$ at 25° C. in air of 60% humidity. This would be even higher at 80 or 90% humidity but increased residence time is then required to achieve equilibrium.

Preferably an amount of desiccant is provided which will last for a period of time covering the colder months of the climate in which the dwelling provided with such an apparatus is located. For example the cooler six months of the year in Northern Europe when heating of dwelling is typically required. A quantity of desiccant of at least 1000 kg, preferably at least 5000 kg and even more preferably at least 7000 kg of desiccant is provided.

At some point in the water adsorption cycle, if no excess desiccant is provided, towards the end of the cold seasonal period (when residential heating is no longer required for comfort) the desiccant beds will have become saturated. When this happens, there will no longer be capacity for adsorption nor its consequent heating effect. The desiccant material then may be discarded and replaced with a fresh dry batch. Alternatively the desiccant may be regenerated (i.e. dehydrated) in-situ, for reuse. It is preferred that the quantity of desiccant material is selected so that the humid heat capture process can take place for the coldest 6 months of the year when heating is required or is welcome.

In this relation a particularly preferred embodiment of the invention provides an apparatus and method for in-situ desorption of the water from the desiccant to regenerate the desiccant material provided. In this relation a heating system in accordance with the invention may further comprise a flow path for a dehydrating gas to be passed to the desiccant in order to remove water from the desiccant.

In accordance with an alternative aspect of the present invention there is provided a method of recovering latent heat of adsorption from a humid gas comprising the steps of;

i) contacting a humid gas with a desiccant material such that water vapour is adsorbed by the desiccant and the latent heat of adsorption is released as sensible heat;

ii) heat exchanging the desiccant material and or the gas with a medium such that at least a portion of the released sensible heat is passed to the medium; and iii) regenerating the desiccant by effecting at least partial dehydration thereof; wherein steps i) and ii) are continued for a period of at least 3 months, preferably 6 months, prior to step iii) being carried out.

Preferably the adsorption cycle lasts from 3 to 9, preferably 6, colder months of the year and the regeneration cycle the remaining 3 to 9, preferably 6, warmer months of the year. The particular cycle will of course depend upon the climate in which the dwelling is located. Since there is a relatively long period (several months) in which the in-situ regeneration can take place it can be effected by a gentle, for example 6 month, regeneration cycle.

It is known to those skilled in the art that regeneration of a desiccant material requires heat and a relatively dry carrier gas stream. The heat is needed to overcome the heat of adsorption and vaporise the water from the desiccant, the drier gas is needed to remove by partial pressure driving force the water vapour away from the desiccant bed at a temperature from 60 to 80° C. A warm low $CO_2$ content carrier gas is also needed to remove any co-adsorbed $CO_2$ from the desiccant.

This process can be accomplished in less than 6 months, even in as little as one month, but then higher temperatures and higher heat flows are needed. This possibly results in a higher degradation of the desiccant resulting in a shorter life cycle of the desiccant.

The regeneration of the desiccant can use solar energy and ambient heat (available in the warmer seasons) to dehydrate the desiccant. It may also further advantageously make use of waste heat sources generated by air conditioning units and refrigeration units. Such waste heat can significantly contribute to desiccant regeneration especially if the regeneration is realised over a long period of time such as several months.

As it is never possible to completely remove all the water from the desiccant by cyclic regeneration, however slowly it is done, there will generally remain by equilibrium, after regeneration, around 5 $kg_{water}/100\ kg_{desiccant}$.

Preferably the step of adsorption of vapour by the desiccant and the step of regeneration are not carried out at the same time in the heating system.

A further advantage associated with the invention when adapted to adsorb $CO_2$ is provided in that $CO_2$ is stored in the desiccant during the cooler months of the year when plant growth and hence uptake of $CO_2$ by plants is at a minimum. This stored $CO_2$ when released in the warmer summer months (when plant growth is at a high level) can be passed to a room in which plants are grown, for example a greenhouse. This provides the two-fold advantage that an increased $CO_2$ concentration is provided in the greenhouse promoting plant growth and $CO_2$ which would have conventionally been released to the atmosphere is instead converted to plant matter.

BRIEF DESCRIPTION OF THE FIGURES

A number of preferred embodiments are described by way of example only and with reference to FIGS. 1 to 9 of which.

DETAILED DESCRIPTION OF ILLUSTRATIVE EMBODIMENTS OF THE INVENTION

Figure 1:
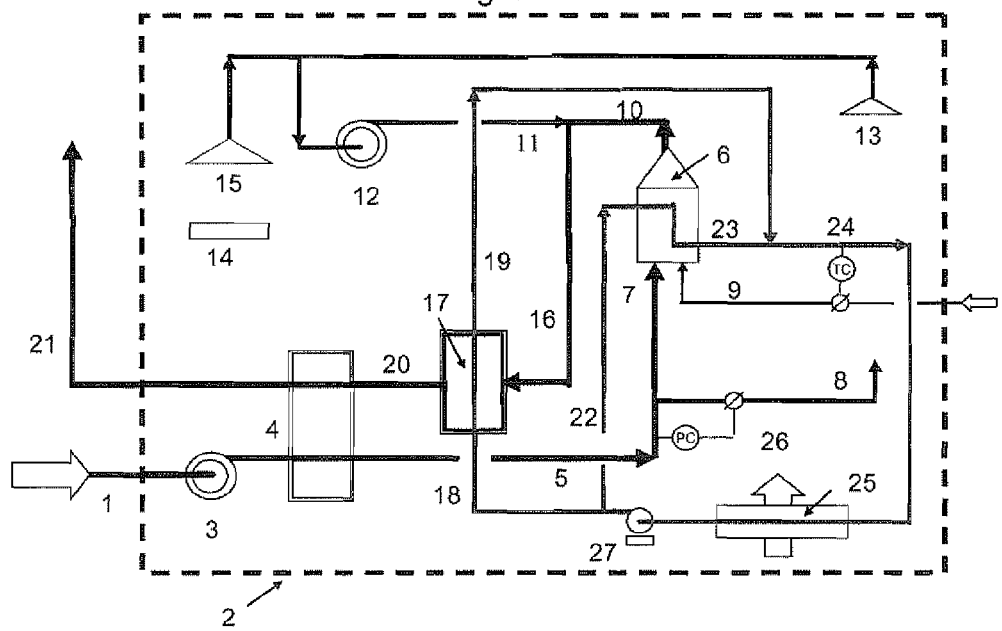
FIG. 1 shows a process flow diagram of a carbonaceous fuel combustion heated hot water system having a forced draft fan and a parallel water circulation.

In a preferred embodiment as depicted in FIG. 1, humid cold air (1) enters the residential dwelling walls (2) through an appropriate duct and is passed to the suction of a forced draft motor driven fan (3). Alternatively, as shown in FIG. 2, the forced draft fan (3) can be replaced by an identically sized induced draft fan just before the flue stack (21) in the chimney.

In the forced draft version as depicted in FIG. 1, the discharge of the fan is passed via appropriate ducting through a gas to gas compact plate and fin heat exchanger (PFHE) (4), preferably constructed of aluminium, inside the dwelling, wherein it is preheated by warmer expelled dry air and flue gasses (20) before being taken via appropriate ducting as stream (5) within the dwelling to various points. Some of the warmed air at a slightly positive pressure is passed through appropriate ducting to the fuel fired water heater (6) as combustion air (7). A part of the warm air is passed through a back pressure control butterfly valve (PC) to be ducted and discharged through appropriately located floor outlet(s) (8). This warmed ambient air circulates throughout the enclosed dwelling and is recaptured by appropriately located ceiling vents to be described further on.

Figure 2:
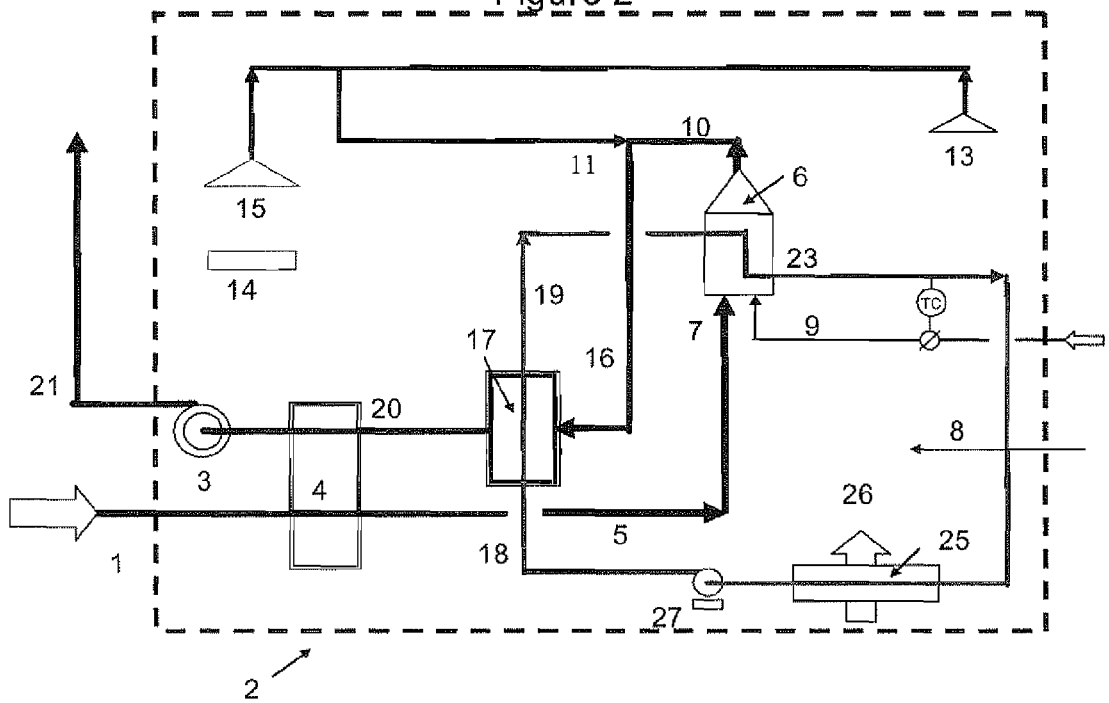
FIG. 2 shows a process flow diagram of a carbonaceous fuel combustion heated hot water system having an induced draft fan and a series water circulation.

In the induced draft version depicted in FIG. 2, no forced floor ventilation is possible. Unavoidable ingress of cold humid air (8) to the dwelling will take place through natural leakage and through momentary opening of doors and windows.

Returning to FIG. 1, combustible fuel (9), preferably natural gas or LPG, enters the dwelling wall (2) at an appropriate pressure and is piped through a temperature control valve (TC) to the gas fired water heater (6) to be combusted with the slightly pressurised dry air (7) in a closed conventional forced draft burner system, design of which is known to those skilled in the art. In the induced draft version the closed fired water heater is operated at a slightly negative pressure more resembling conventional fired water heaters. To the moist under-saturated (i.e. above water dew point temperature) warm flue gas (10) exiting from the top of the closed fired heater (6) is admixed via duct (11) all the moist under-saturated air collected by motor driven fan(s) (12) within the dwelling as shown in FIG. 1. In the induced draft version of FIG. 2, the fan(s) can be omitted if the aspiration induced by the fan (3) is sufficient. In both versions however, all warm humid air, including the incoming ventilation air (8) together with the humidity generated by humans and animals residing in the dwelling are collected within the dwelling from ceiling ventilator(s) (13) as well as the kitchen hot plate(s) (14) through their overhead hood(s) (15).

Figure 3:
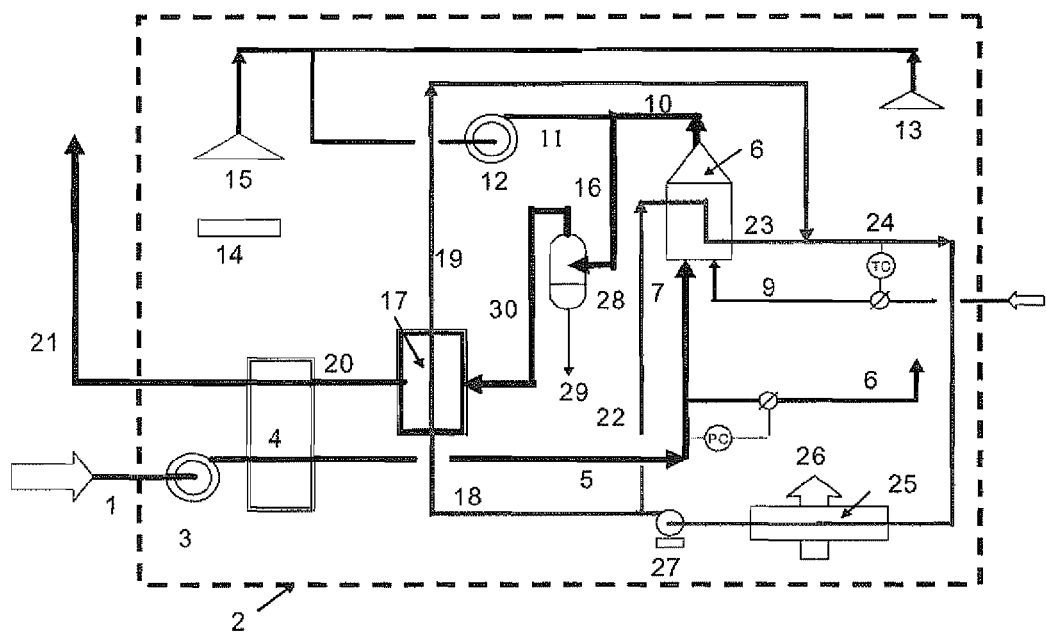
FIG. 3 shows a process flow diagram of a carbonaceous fuel combustion heated hot water system having a phase separator drum on the flue gas.

The combined warm humid air together with flue gas (16) is appropriately ducted to one end of a stationary volumetric compartment (17) which is randomly filled with desiccant material having a high propensity to capture water vapour. Should the exiting flue gas (10) and moist air (11) mixture (16) be at or below its water dew point by cooling heat exchange within the fired heater, then a phase separator drum (28), as shown in process flow diagram of FIG. 3, would be added before passing the mixture to the desiccant compartment (17). This is to avoid free water contact with the desiccant material. Some desiccants such as commercial Sorbead™ are very fragile and can break-up in the presence of free water. In such case, as shown in FIG. 3, the water stream (29) would be removed from the separator drum (28) giving a saturated flue gas (30) without free water droplets to enter the desiccant compartment (17).

Figure 6:
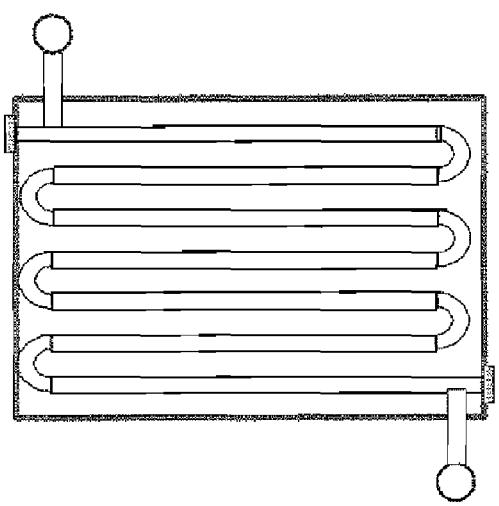
FIG. 6 shows a section view along line A-A of FIG. 5.

In the case of electrically heated residential dwellings there is no water vapour to recover from a carbonaceous-fuel-fired heater. However, the recovery of other sources of humidity already mentioned could be practised with a beneficial saving of electric power. In the process flow depicted in FIG. 4 the fired heater (6) is replaced by an electric resistance element heater on the hot water circuit. Only humidity collected by hoods (13) and (15) would be appropriately ducted to the desiccant compartment (17). Another benefit of this type of ventilation system is the possibility to withdraw a very dry air stream (30) from the discharge of the induced draft fan (3) as shown in FIG. 6. This dry stream could be ducted to areas of the dwelling where dry air is required.

Figure 5:
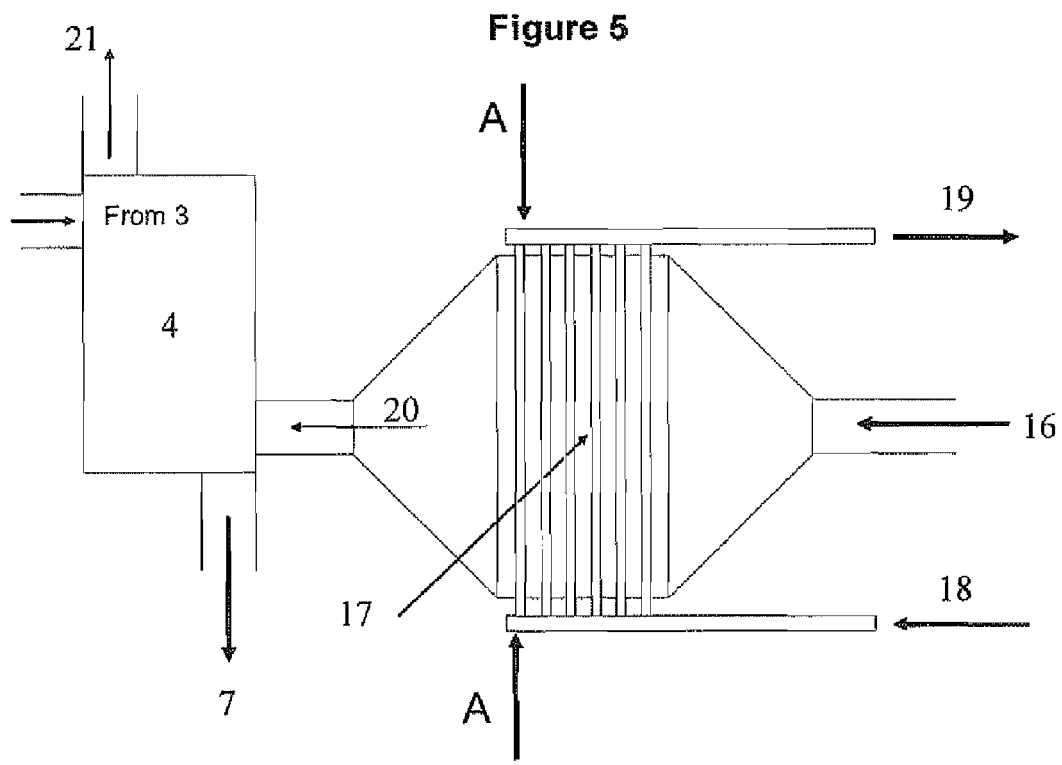
FIG. 5 shows a schematic diagram of a desiccant compartment.

A possible physical but non limiting, arrangement and design of the desiccant compartment (17) is illustrated schematically in FIGS. 5 and 6. In this possible arrangement parallel manifolded tube sections (for example in the form of cooling coils), such as depicted by section A-A of FIG. 6, are incorporated into a perpendicular path with the humid gas flow. The tubes are preferably made of copper or aluminium or an alloy of either of these. It will be appreciated by the reader that the function of the tubes is to act as a heat exchange membrane so that the desiccant material and the media passing through the tubes are in good thermal contact. To this end a variety of heat various heat exchanger arrangements could be used as the heat exchange membrane, the invention not being limited to tubes, a particular cross-section of tube, or to a particular arrangement within the desiccant.

The tube section into which the absorption heat is transferred depends upon the linear progress of, what is called, the mass transfer zone (MTZ) of the desiccant bed with time. In the beginning of cycle it will be close to the inlet of the compartment while at the end of cycle it will be closer to the end of the compartment. For a six month cycle perhaps six sections can be considered; one for each month. Temperature measurements can easily be taken to follow the progress of the MTZ.

Figure 4:
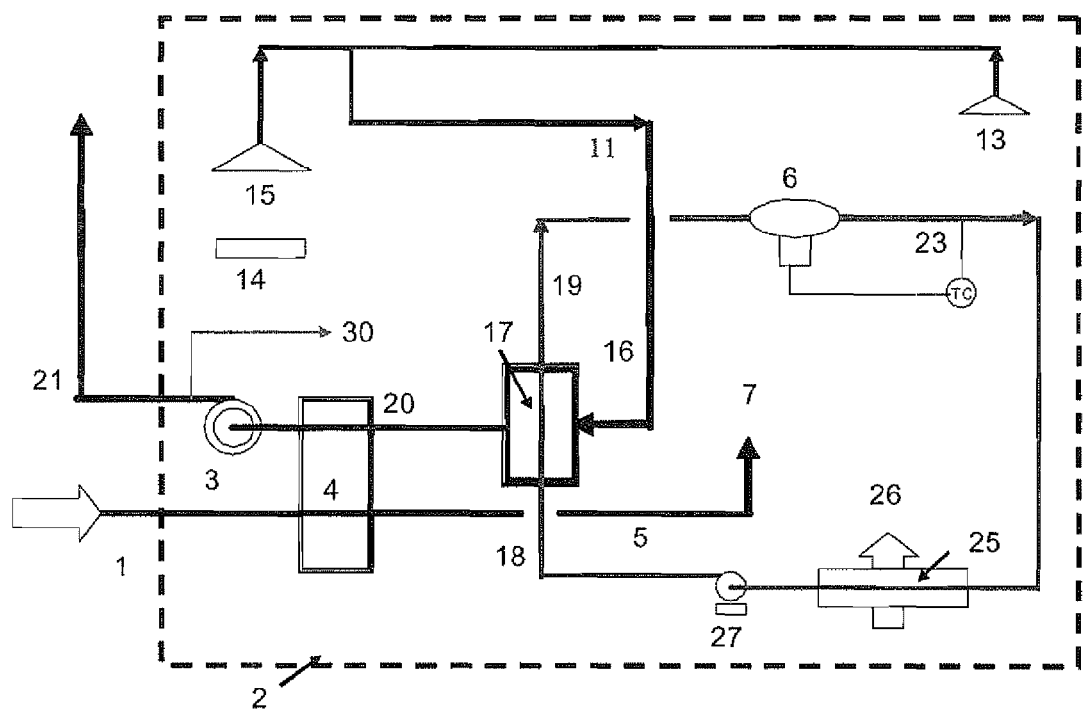
FIG. 4 shows a process flow diagram of an electrically heated hot water system.

The desiccant bed heats up while adsorbing water molecules in the vapour state from the humid air and flue gas. The bed is maintained at nearly isothermal condition, at temperatures between 40° C. to 70° C., but preferably 50° C., by the cooling coils interwoven within the desiccant bed as shown in FIG. 6. The external surface of the tubes can be extended with either transverse or longitudinal fins as is well known and practised in the design of heat transfer equipment. A part or all of the returning cool circulating water (18) needing to be heated for its reuse as a hot water beating medium for the dwelling is used as the coolant for the desiccant bed. The cold water thereby is preheated before being piped either in series to the fired or electric heater (6) as shown in FIGS. 2 and 4 or, preferably, piped in parallel with the fired heater as warm water (19) as shown in FIGS. 1 and 3.

The warm and essentially dry flue gas (20) leaving the opposite end of the desiccant compartment (17) through an appropriate duct is passed to the inlet air heat exchanger (PFHE) (4) already mentioned to be cooled to within 5° C. of the outside air temperature before being expelled as cooler very dry gas (21) through the stack in a chimney as shown in FIG. 1. Alternatively the flue gas (20) is taken to the suction of the induced draft fan (3) before being expelled as a cool very dry gas (21) as shown in FIG. 2.

In both versions the heat content of this expelled waste stream is appreciably lower than would be in a conventionally efficient residential heating system expelling water saturated gas at a much higher temperature. It would be even lower than that which could be attained with the best available condensing heat exchange technology. All of its humid heat content including the heat of wetting has effectively been captured to heating the dwelling.

As shown in FIGS. 1 and 3, to the very hot water (23) exiting the water heater (6) is admixed the parallel stream of warm water (19) heated in the desiccant compartment (17). In the series arrangement as shown in FIGS. 2 and 4 no mixing takes place since the water is first preheated in the desiccant compartment (17) then in the fired or electric heater (6). The mix or final temperature is controlled by the temperature control valve (TC) on the fuel or electric power line already mentioned. The hot water is appropriately piped and circulated throughout the dwelling, as is the conventional custom, through a number of parallel connected convection air heat exchangers (or radiators) (25) (only one of many is shown). The hot water, perhaps at 80° C., is cooled to around 30° C. while heating the inside air (26) within the dwelling by pure convection. The cooled water collected from all parallel radiators is then passed to a conventional motor driven circulation water pump (27) which counteracts the water circulation system pressure drop and assures the appropriate flow through the water system. The water fill, pressure surge bottles and other items belonging to the conventional water circuit are omitted for simplicity. The water pump discharge is then split to stream (18) and (22) respectively partly going to the desiccant compartment (17) and remainder to the fired heater (6) in the parallel connected mode as shown in FIGS. 1 and 3. In the series connected mode as shown in FIGS. 2 and 4 all of the water pump (27) discharge (18) goes first to the desiccant compartment (17) to be preheated (19) then to the fired or electric heater (6) to be heated to final temperature. In both modes the savings in fired fuel and/or electric power are equivalent.

In order to calculate the amount of desiccant required, the differential equilibrium capacity (i.e. between adsorption and regeneration conditions) is the important criteria. For realistic sizing a differential equilibrium capacity of 25 to 55, for example 40 $kg_{water}/100\ kg_{desiccant}$ could be used in this application. With months of adsorption time with over 80% humidity air and flue gas available equilibrium conditions are attainable.

As discussed under the statement of invention the water retention capacity of the desiccant material in the present invention is of course finite and that in this relation a particularly preferred embodiment of the invention provides an apparatus and method for in-situ desorption of the water from the desiccant to regenerate the desiccant material provided.

The following detailed description of an exemplified regeneration apparatus pertains only to the forced draft options depicted in FIGS. 1 and 3, however it can equally be applied to the embodiments depicted in FIGS. 2 and 4 and to other embodiments.

Figure 7:
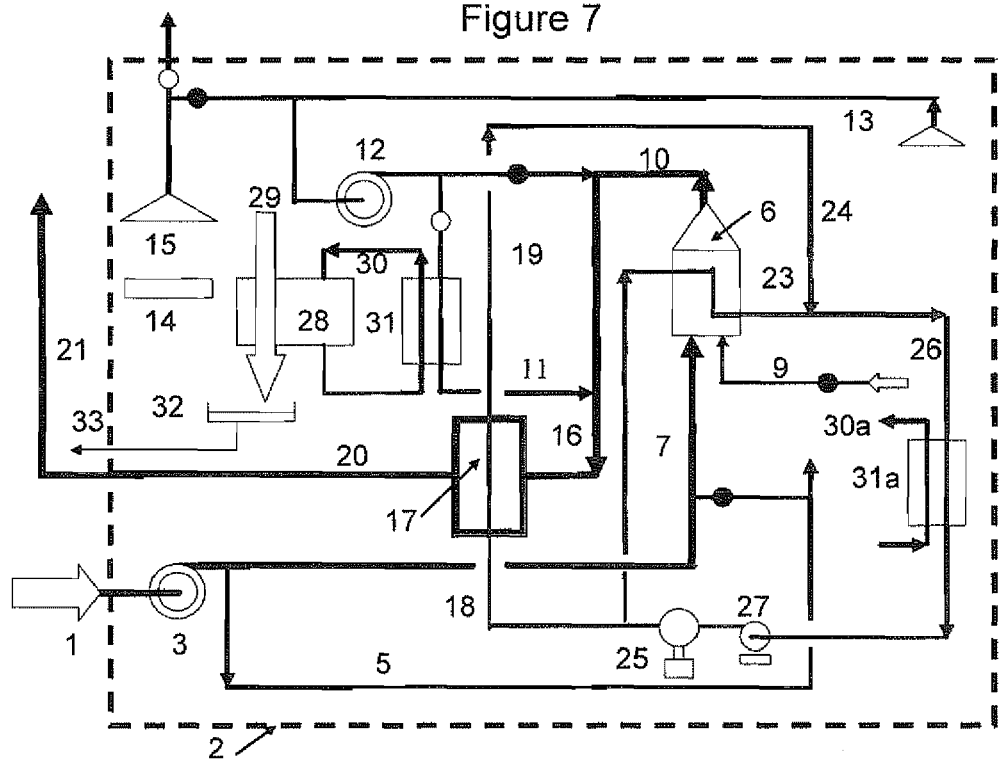
FIG. 7 shows a process flow diagram of a carbonaceous fuel combustion heated hot water system arranged for desiccant regeneration and having a parallel water circulation system.
Figure 9:
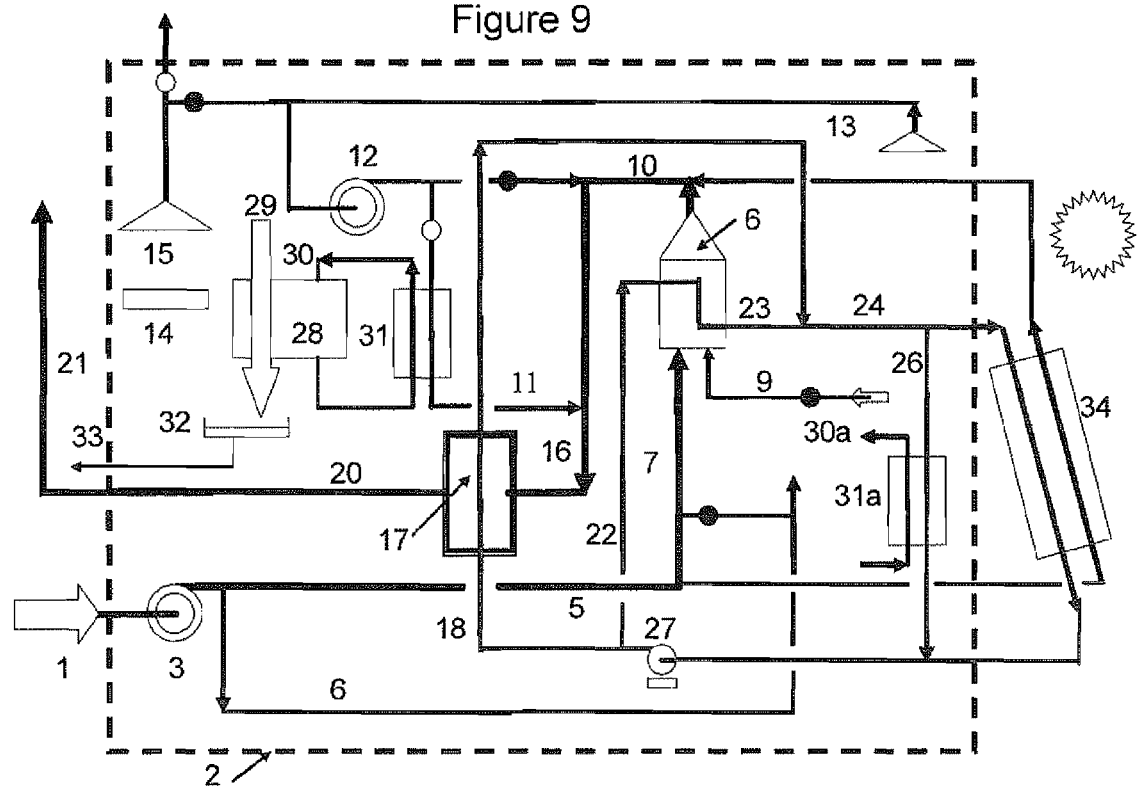
FIG. 9 shows a process flow diagram of a further preferred embodiment of a carbonaceous fuel combustion heated hot water system arranged for desiccant regeneration with complimentary solar heating.

Referring to FIG. 7, ambient warm summer air (1) is taken through the dwelling wall (2) to the suction of the motor driven fan (3). The discharge is then passed via appropriate ducting partly as ventilation air stream (5) to be cooled and dehydrated within the dwelling by air conditioning (discussed later) and partly is passed as stream (7) as in the winter cycle to the water heater (6) but this time to be further heated by the warmed-up circulating water stream (22) within the non-fired heater. Note that the plate fin heat exchanger (4) as shown in the FIGS. 1 to 4 in the previous referenced disclosure is now by-passed thus is not shown. The heater (6) now serves as a heat exchanger since there is no gas firing (noted as a closed black ball valve). In the solar version of this invention, as depicted in FIG. 9, the air can also and optionally be heated with summer sunshine to rather high temperature by solar panels (34).

As in the heating adsorption cycle the heated air (10) is appropriately ducted to be passed through the desiccant compartment (17) but this time to serve as a part of the inlet carrier gas stream (16). The second and more important part of this total carrier stream (16) is the admixture of the warm and much drier air (11) delivered by the air conditioning refrigerant condenser(s) (31) to be discussed further on. This stream is very important in the mixture as its humidity is very low and consequently improves the water stripping capability.

As in the first disclosure the warmed-up dry air is passed through the water heated desiccant compartment (17) but this time to de-sorb or strip-out the water molecules from the circulating water heated wet desiccant bed. The under saturated moist warm stream (20) is then passed by appropriate ducting to the stack (21) in the chimney and expelled to the outside air.

Figure 8:
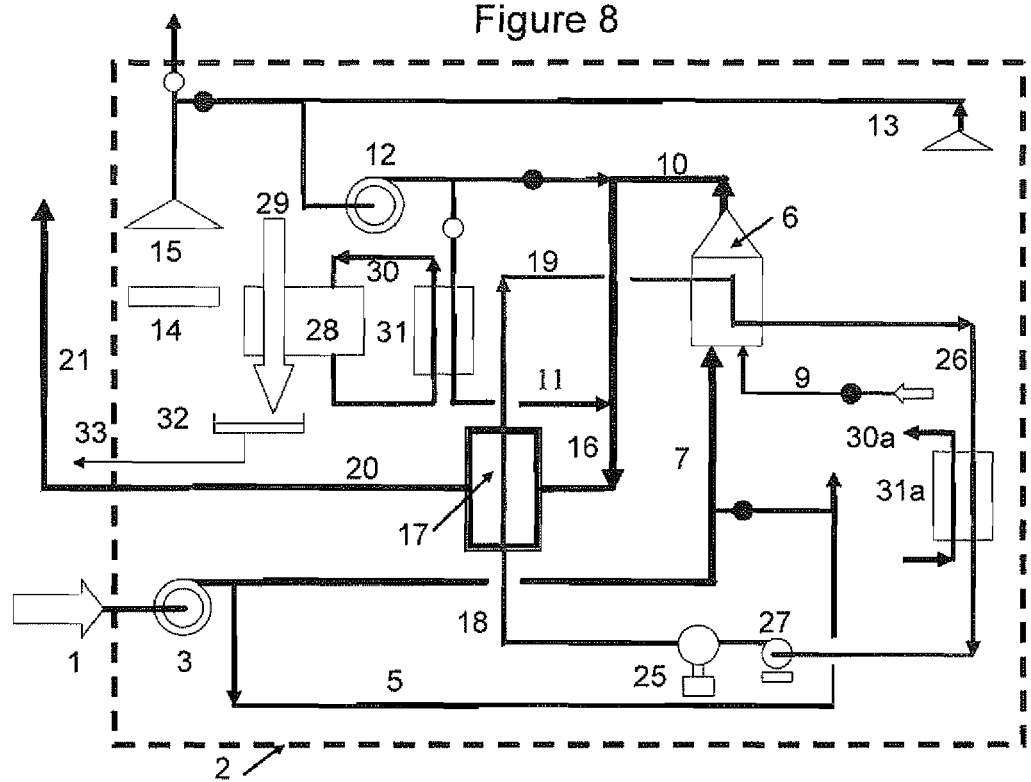
FIG. 8 shows a process flow diagram of a carbonaceous fuel combustion heated hot water system arranged for desiccant regeneration and having an in series water circulation system.

The water circulation flow is maintained both through the water heater (6) and desiccant compartment (17). In the regeneration cycle the water will act both directly and indirectly as a heating medium for desiccant regeneration rather than being heated by the adsorption of water vapour. As mentioned the water circulation can be in parallel, as shown in FIG. 7, or in series, as shown in FIG. 8. Moreover, the regeneration heat needed during the long regeneration cycle doesn't need to be continuous. However during the complete regeneration cycle, it does need eventually to accumulate somewhat more heat than that which was recovered during the adsorption heating cycle.

Part of the hot water circulation (18) maintained by the water pump (27) is passed through the coils within the desiccant compartment to heat the bed uniformly to around 60° C. throughout while being cooled. Part of the cooling of the circulating water is by the vaporisation of water from the desiccant bed. In the parallel configuration, the cooled water (24), as shown in FIG. 7, is then used as a part of the total coolant (26) to counter-currently condense air conditioning refrigerant in water cooled condenser(s) (31a) while being reheated by the expelled heat of refrigerant condensation. In the series circulation configuration as shown in FIG. 8, the cooled water (19) leaving the desiccant compartment (17) is further cooled in non-fired heater (6) before being used as the coolant (26). In both configurations supplemental, heat can be added to the warm water through various heat exchangers or heating elements depicted for simplicity as item (25). This can be an electric resistance element type water heater in electrically heated dwelling as in FIG. 4 of the previous cited disclosure. Otherwise, item (25) can also include heat exchanges with hot discharge water from washing machines and other hot water drainage. At times when electricity costs are low or generated by alternative sources, such as wind generators, it can be electrically heated. In the beginning of the regeneration cycle electric heat could be used for an unspecified initial period of time to attain the appropriate reactivation temperature for a given desiccant (i.e. 80° C. for silica gel). In the solar version of the invention as depicted in FIG. 9 the hot water circulation can also be assured with appropriately designed solar panels (34) heating the water to rather high temperatures when the summer sun is shining. Regeneration heating does not need to be continuous but can be cumulative.

In the parallel circulation configuration part of the circulating hot water (22) as shown in FIG. 7 is passed to the coils of the non-fired heater (6) to heat the air stream (7) by heat exchange within the surface provided as already mentioned. In the series circulation configuration, as shown in FIG. 8, the cooled but still warm water stream (19) leaving the desiccant compartment (17) is passed to the coils of the non-fired heater (6) to heat air (7) and be further cooled. This is then the indirect heat to be supplied via the carrier gas (10) to the desiccant bed. The warm, low water dew point gas stream at a temperature of roughly 60° C. is passed to the volumetric compartment which is further heated by water coils to above 60° C. to induce a slow evolution of the water vapour from the wet desiccant. Water can be expected to be evolved at around 60 to 90° C. regardless of the pressure within the regeneration vessel.

Usually residential air conditioning systems condensing pressurised refrigerant vapours takes place outside the dwelling walls and uses warm ambient air in air cooled heat exchangers for the heat transfer. The waste heat is expelled without useful recovery. In a principle embodiment of this invention, the coolant for refrigerant vapour condensation is provided by collected cool drier inside air conditioned air. This is recovered as the important dry warm air complement (11) of the carrier air (16) needed for desiccant regeneration. The cool air with low water dew point is aspirated up by fan (12) from appropriately located vents (13) within the dwelling and by material balance represents at least the amount of ambient fresh air stream (5) admitted to the dwelling as mentioned in the beginning.

Passing through the conventional refrigerated air conditioning system (28), design of which is not a part of the present invention, the relatively moist warm incoming air (29) is cooled and partly dehydrated by the chilling effect of air conditioning. Water condensed from the air is collected in a catch basin (32) and subsequently expelled to the outside as stream (33). Meanwhile the exiting cold air, having a water dew point equal to its temperature, contributes to the cooling comfort of the inside air making it drier than the ambient air. This aspect of stream (11) as a carrier air stream is very important for the efficient mass transfer effect of desiccant drying since a low partial pressure of water vapour as well as high temperature favours the de-sorption of water molecules from the solid to the vapour phase.

The air conditioning refrigerant vapour condensation is also achieved with the cooled circulation water stream (26) in FIGS. 7 to 9. The water stream is thereby heated while condensing refrigerant. Clearly the useful heat exchange with air conditioning refrigerant will not reduce the electric power consumption of air conditioning of the dwelling in the summer. However, it will enhance the overall annual energy efficiency of the dwelling since it contributes to the regeneration of the desiccant allowing the saving of heat energy in winter.

Thus, the invention has been described by reference to certain embodiments discussed above. It will be recognized that these embodiments are susceptible to various modifications and alternative forms well known to those of skill in the art. Many modifications in addition to those described above may be made to the structures and techniques described herein without departing from the spirit and scope of the invention Accordingly, although specific embodiments have been described, these are examples only and are not limiting upon the scope of the invention.

It should be noted that the term "comprising" as used in the claims or description of this application does not exclude other elements or steps; and the terms "a" and "an" do not exclude a plurality. Any reference signs in the claims shall not be construed as limiting the scope of the claims.

It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. A method of recovering latent heat of adsorption from a humid gas comprising the steps of;
   i) contacting a humid gas with a desiccant material such that water vapour is adsorbed by the desiccant and the latent heat of adsorption is released as sensible heat;
   ii) heat exchanging the desiccant material and or the gas with a media such that at least a portion of the released sensible heat is passed to the media; and
   iii) regenerating the desiccant by effecting at least partial dehydration thereof; wherein
   steps i) and ii) are continued for a period of at least 3 months prior to step iii) being carried out.

2. The method of claim 1 wherein the steps i) and ii) are continued for a period of at least 6 months prior to step iii) being carried out.

3. The method of claim 1 wherein regeneration of the desiccant is effected by contacting the desiccant with a dehydrating gas supply.

4. The method of claim 1 wherein regeneration of the desiccant is at least partially effected by heating the desiccant using one or more energy sources selected from;
   i) solar energy;
   ii) outside air of a suitable temperature and humidity;
   iii) waste-heat from refrigerator units and/or air-conditioning units.

5. The method of claim 1 wherein the steps of; i) contacting humid gas with the desiccant; and iii) regeneration of the desiccant, do not take place simultaneously.

6. The method of claim 1 wherein the humid gas is drawn from a room of a building having a source of humidity.

7. The method of claim 6 wherein the source of humidity comprises: respiration of a animals; transpiration of plants; evaporation of water from other sources; a flue gas of a carbonaceous-fuel burning heater; or humid air drawn from outside the building.

8. The method of 1 wherein the desiccant material is a solid desiccant material selected from a group consisting of silica gels; activated alumina; activated bauxite; and one or more molecular sieves.

9. The method of claim 1 comprising use of a heating system for a building comprising;
   i) a heater;
   ii) a media flow passage through which a medium heated by the heater passes in order to distribute heat through the building; and
   iii) a heat recovery apparatus for recovering latent heat of adsorption from a humid gas, comprising;
      a) a gas flow passage connected at one end to a source of humid gas; and
      b) a desiccant material provided within the gas flow passage such that the humid gas contacts the desiccant material and water vapour is adsorbed releasing latent heat of adsorption; wherein
   the media flow passage and gas flow passage are in heat exchanging relationship, such that when the desiccant material adsorbs water vapour from the exhaust gas the latent heat of the adsorption is at least partially transmitted to the medium.

10. The method of claim 9 wherein the heater is an electric heater.

11. The method of claim 9 wherein the heater is a carbonaceous-fuel-fired heater and the humid gas source comprises an exhaust gas of the heater.

12. The method of claim 9 wherein at least 1000 kg of desiccant is provided in the gas flow passage.

13. The method of claim 9 wherein at least 5000 kg of desiccant is provided in the gas flow passage.

14. The method of claim 9 wherein the building is a residential or commercial dwelling.

15. The method of claim 9 comprising a regenerating-gas flow path for bringing a supply of a regenerating-gas into contact with the desiccant material, wherein the regenerating gas is of a suitable humidity and temperature to effect at least partial dehydration of the desiccant.

16. A method of heating a building, comprising the steps of;
   i) heating a distribution-medium by means of a heater;
   ii) circulating the heated distribution-medium through the building to distribute the heat; and
   iii) recovering the latent heat of adsorption from a humid gas in accordance with claim 1.

17. The method of claim 16 wherein the humid gas source comprises a humid gas of a room of the building, in which there is a supply of humidity, for example respiration.

18. The method of claim 16 wherein the heater is an electric heater.

19. The method of claim 16 wherein the heater is a carbonaceous-fuel-fired heater and the humid gas source comprises an exhaust gas of the heater.

20. The method of claim 16 wherein at least 1000 kg of desiccant is provided in the gas flow passage.

21. The method of claim 16 wherein at least 5000 kg of desiccant is provided in the gas flow passage.

22. The method of claim 16 wherein the desiccant material is a solid desiccant material selected from a group consisting of silica gel; silica gel beads; activated alumina; activated bauxite; and one or more molecular sieves.

23. The method of claim 16 wherein the building is a residential or commercial dwelling.

24. The method of claim 16 wherein during the step of contacting the humid gas with the desiccant material, the desiccant material is maintained at a temperature between 20° C. to 70° C.

25. The method of claim 16 wherein the during the step of contacting the humid gas with the desiccant material, the desiccant material is maintained at a temperature between 30° C. to 60° C.

26. The method of claim 16 wherein the during the step of contacting the humid gas with the desiccant material, the desiccant material is maintained at a temperature between 40° C. to 50° C.

* * * * *